March 22, 1949.   M. GALLAI-HATCHARD   2,464,858
APPARATUS FOR THE PREPARATION OF
POROUS SLAGS OR OTHER SMELTS
Filed Feb. 19, 1946   2 Sheets-Sheet 1
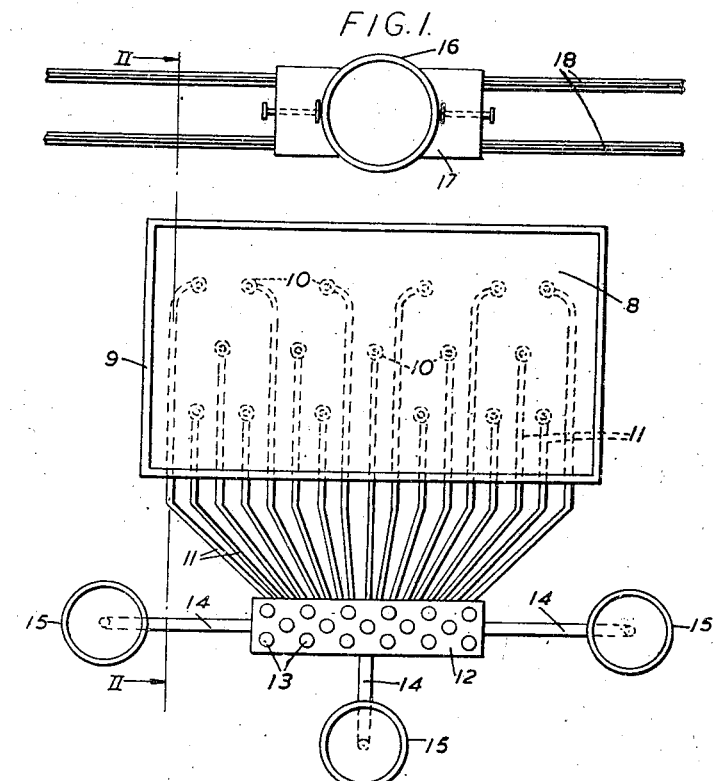
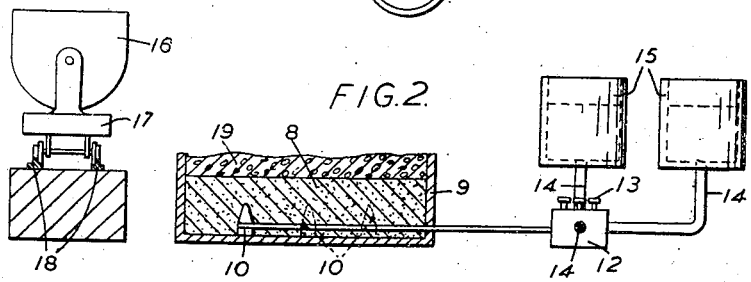
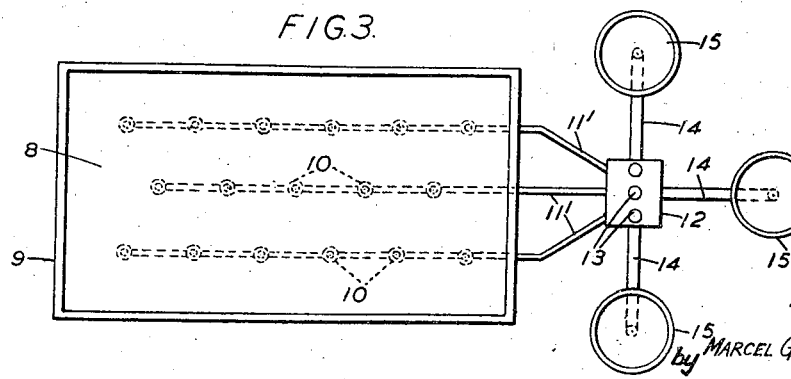
Inventor
MARCEL GALLAI-HATCHARD
by Haseltine Lake & Co.
Attorneys March 22, 1949.　　　M. GALLAI-HATCHARD　　　2,464,858
APPARATUS FOR THE PREPARATION OF
POROUS SLAGS OR OTHER SMELTS
Filed Feb. 19, 1946　　　　　　　　　　　2 Sheets-Sheet 2
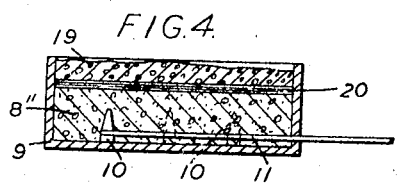
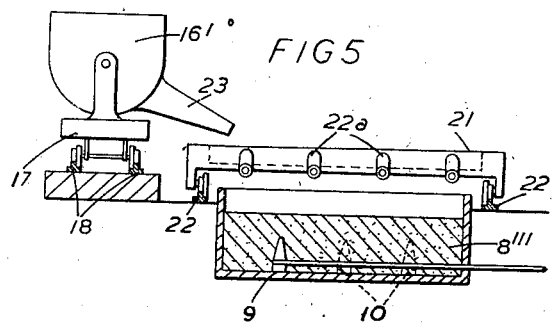
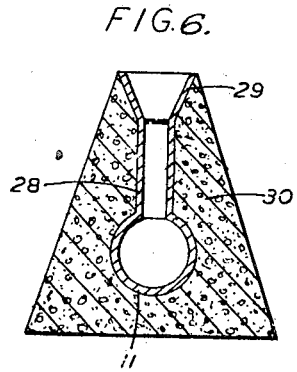
Inventor
MARCEL GALLAI-HATCHARD
by
Haseltine, Lake & Co.
Attorneys

Patented Mar. 22, 1949

2,464,858

UNITED STATES PATENT OFFICE 2,464,858

APPARATUS FOR THE PREPARATION OF POROUS SLAGS OR OTHER SMELTS

Marcel Gallai-Hatchard, Cheam, England

Application February 19, 1946, Serial No. 648,785
In Great Britain January 18, 1943

Section 1, Public Law 690, August 8, 1946
Patent expires January 18, 1963

3 Claims. (Cl. 49—14)

This invention relates to apparatus for the production of a porous or cellular foamed material from slags or other smelts.

More particularly this invention relates to the subject matter divided out of my application, Serial No. 534,840 which issued as Patent No. 2,443,103 on June 8, 1948, filed May 9, 1944, and thus is directed to improved apparatus for carrying out the method of producing porous or cellular foamed slag or other smelts as described and claimed in my aforesaid application.

To produce foamed slag or smelts it has already been proposed to pour molten blast furnace slag over a static bed of porous sand or like material which, prior to the pouring of the slag, has been well moistened with water.

This method, which can for convenience be referred to as the "sand-foaming" method, should, if successful, have had substantial advantages over the various forms of foaming machines such as those employing foaming wheels, conveyors and the like, because it would have eliminated the extraordinary heavy maintenance costs of these machines. These machines, being exposed to molten material at a temperature of about 1400–1500 degrees centigrade and to cold water and steam contaminated by sulphuretted hydrogen, are subject to exceptional wear and tear and are short lived.

In spite of this most attractive advantage of sandfoaming over machine foaming, the former method could not be adopted for the cheap mass-production of foamed smelts and the method, notwithstanding the advantage mentioned, has been abandoned mainly for the following reasons:

It is well known that blast-furnace slags vary within wide limits in regard to their chemical composition, temperature and viscosity. The degree of foamability of slags depends, however, essentially on these three properties. Blast furnaces are operated to produce iron and not slag, and, therefore, the production of suitable slags is, at best, only of secondary importance. It is due to this fact that foaming methods, to be successful, must be capable of adapting themselves readily to the variations in the properties of the slag. In short, the methods must be controllable to a marked degree. Such adaptation does not present a serious problem when machines are used for foaming, as it is comparatively easy to provide for the control of such machines by varying the speed of movement of their parts, in order to reduce or increase the quantity of slag subjected to foaming per unit of time. The same applies to the water supply which is also readily variable within wide limits where a machine is employed.

There is, however, a limit to the variation of quality in connection with machine foaming. The limit is set by the fact that the iron or steel components of the foaming machines can stand up to only a certain amount of heat. Beyond this, cracking or buckling occurs. A slag or smelt which is easily foamable will respond immediately on being brought into contact with the water of the foaming machine, producing thin cell walls which lose their glow in a few seconds. Such material can remain in touch with iron or steel without causing damage. Less foamable material, however, or material which should be foamed less in order to produce a stronger and heavier foam, will have strong cell walls which will remain plastic and glowing for a considerable time. In these circumstances, the material will play havoc with iron or steel necessitating repairs and involving maintenance costs entirely out of keeping with the value of the foamed slag as an industrial material.

Hence, from the economic point of view, machine foaming can deal only with the lighter types of foams. As heavy foams have a great field of usefulness in connection with structural light weight concrete, the impossibility of producing at a reasonable cost these kinds of foams on machines is a serious drawback.

The ability to obtain the necessary control with the sand-foaming methods and the apparatus therefor as proposed up to now was completely lacking. The bed of sand had to be well moistened previously to pouring. Due to the very high temperature of the molten slag, the comparatively small quantity of moisture contained in the top part of the sand bed was instantly evaporated as soon as pouring commenced, thereby producing a top layer of perfectly dry porous sand which acted as an effective insulator for the moisture in the lower layers and so prevented additional moisture reaching the slag. The pouring of the molten slag on to the sand bed from a single fixed position had the further disadvantage of producing a comparatively thick layer of slag which, in consequence, could be foamed only to a small degree as the quantity of moisture contained in the top part of the sand bed was completely inadequate for treatment of the layer of slag throughout its depth. Inundation of the sand bed with water to an extent necessary to produce a water lever on top of the soft sand mud proved ineffective as it led to the production of granulated slag instead of foamed slag. The formation of a thick layer of slag could have been avoided by moving the ladle while the slag therein was being emptied over the sand bed, thereby aiming to produce a layer of slag sufficiently thin for the moisture contained in the top part of the sand bed to be adequate. Under these conditions, however, the area required to obtain a sufficient output of foamed slag would have been so excessive as to be uneconomical for practical purposes.

The ultimate result of operating with the sand foaming method with the apparatus as heretofore known was that the foam produced was considerably heavier and denser than, and could not compete with, the produce of controlled machine foaming which, for the sake of plant maintenance, is limited to the production of light foam. On the other hand, the use of the sand foaming method for the production of a light foam by spreading the molten slag in a thin layer would not constitute a competitive method for the mass production of foamed slag, owing to the large floor area required if a good output is to be maintained. These are the reasons why, in spite of the great attractions attached to the elimination of high plant maintenance costs, the sand foaming method failed and was abandoned.

Summing up the difference between sand foaming and machine foaming, it can be said that sand foaming could produce only foamed slags that are far too heavy, whilst machine foaming can produce only the lighter types of foamed slags.

Accordingly one of the objects of this invention is to provide improved apparatus for the production of foamed or cellular materials from slags or other smelts which is adopted to overcome the disadvantages heretofore encountered.

Another object of the invention is to provide apparatus adapted to produce an improved foamed or cellular material from slag or other smelts in a more economical manner.

Still another object is to provide apparatus for carrying out the method of producing foamed or cellular material from slags or other smelts which method is disclosed and claimed in my aforesaid application Serial No. 534,840.

A further object of this invention is to provide suitable apparatus adapted so to improve the original sand foaming method, that while retaining the same basic characteristics, it is brought under full control during the foaming operation and thus is capable of dealing effectively with the varying qualities of molten slag or alternatively produce varying qualities in the foamed product. By the invention it is possible to obtain foamed slag in a wide range of quality.

For a better understanding of the invention, together with other and further objects and advantages thereof, reference is had to the following description, with reference to the accompanying drawings, in which—

Figure 1 is a plan view of one embodiment of the apparatus according to the invention;

Figure 2 is a sectional elevation on the line 2—2 of Fig. 1;

Figure 3 is a plan view illustrating a modified arrangement of the water pipes;

Figure 4 is a sectional view, similar to that of Fig. 2, illustrating a further modification of the foaming bed, in which the bed is made of porous concrete;

Figure 5 is an end view, partly in section, illustrating means for distributing the slag over the foaming bed;

Figure 6 is a sectional view illustrating a suitable construction of a water jet.

In general, the apparatus for producing foamed slag or other smelts according to this invention comprises a bed of sand with a suitably arranged net-work or lay-out of pipes through which an ample quantity of water can be supplied below the poured out molten slag under adjustable pressure within the very short time required for the actual foaming. The pipes are buried in or arranged below the sand bed.

The pipes are provided with a suitable number of discharge points, preferably in the form of jets or nozzles which are preferably directed upwards.

The design of the pipe network should provide for a fairly equal pressure at each discharge point.

The control of the water discharged into the sand bed should preferably be situated at a point or points from which the actual proceedings on the sand bed can easily be observed. This control may consist of a number of valves which should be so constructed or arranged as to enable the operator, on one hand, to increase or decrease the pressure of the water supply and, on the other hand, to supply water to the whole or only a part or parts of the surface of the sand bed during the actual foaming operation.

As an alternative to the use of a bed composed of sand, there may be utilized, for special purposes, a bed made up from porous aggregates of larger size, say ½" or so forming larger cavities which will permit the use of larger quantities of water and avoid the formation of mud or sludge.

Still another alternative is to construct the bed out of porous honeycombed concrete. Such a honeycombed bed with a well levelled surface can be saturated with water even to the extent of producing a film of water on top of the concrete. This film of water will initiate the foaming when the molten slag is poured on the bed and be followed up by additional quantities of water supplied from the pipe network embedded in the porous concrete bed. Thus no granulation will take place which, as mentioned before, would be the case if molten slag were poured on to a soft sand bed which is oversaturated with water.

By means of the invention, the foaming of the molten slag will not depend only on the limited, and in most cases, inadequate quantity of water contained in the moist sand and which was supplied prior to the pouring operation; on the contrary, the slag will receive all the additional water that it requires to convert it into foam of the required degree of porosity, and this both during and after the actual pouring operation. Moreover, the slag will receive the additional water where it is required and from the correct direction, namely, from underneath. This latter factor is an important consideration, as the application of water from the top onto the molten slag will not produce foam, but will break up the material into granules. It is essential to trap the water underneath the molten layer of slag in order to produce steam of sufficient pressure to penetrate the slag both initially and while the slag remains possessed of sufficient viscosity to allow a continuation of such penetration.

By the invention, not only can the necessary quantity of water be supplied at the right time, but, by reason of the provision for control, the water supply can also be localised to particular sections of the foaming area. The ultimate result of this facility is that the operator is in a position to vary the quantity and the degree of porosity of the foam in patches or localities in relation to the layer of slag as a whole. He is thus able to produce in one pouring operation, and at his choice, various quantities of foam of different densities, which, when crushed and mixed, will give the particular blend required.

A further advantage of the invention is that the thickness of the layer of slag that can be poured over the foaming bed will depend solely on the possibility of obtaining an adequate water supply within a short period, and that will not usually present any difficulty. Providing ample water is available, 10 to 20 tons of slag in a single ladle can be poured over the foaming bed with one tilt of the ladle and foamed simultaneously in 1 to 2 minutes—a time limit quite impossible with machine foaming.

Owing to the various factors mentioned above, the floor area required for the mass production of the foamed slag according to the invention, can be reduced to one or two sand beds of limited size which, by reason of the fact that proper foaming takes place thereon, will cool quickly for clearing and re-use.

Additional control in the foaming operation can be achieved by providing one or more troughs for conveying the molten slag from the ladle to the sand bed. The trough or troughs may have branches or be provided with a number of outlets for controlled distribution of the molten slag over the sand bed, or may be movable for the speedy and equal distribution of the molten slag as it comes from the ladle. A speedy and equal distribution of the molten slag can be also achieved by laying out the sand bed in a particular way, as by making it up in the form of steps so that a cascade effect is produced when the molten slag is poured thereon. Under these conditions each step of the bed will take only a certain quantity of molten slag, the overflow being passed on automatically to the next step and so on.

Having thus described the invention in a general manner, the same will now be described more specifically with reference to the drawings. In Figs. 1 and 2, the foaming bed is indicated at 8. It may consist of sand, or of porous aggregates of larger size than sand particles, or of porous honey-combed concrete. The bed is confined in an open-topped frame or box 9 of suitable material and of convenient size and shape, the frame or box being shown in the drawings as of rectangular shape when viewed from above.

Buried in the foaming bed are a plurality of evenly distributed jets 10 each of which is fed with water by a pipe 11 extending from a chest or manifold 12 which is provided with a plurality of control valves 13, one for each feed pipe 11. Water is supplied to the chest or manifold by supply pipes 14 extending from storage tanks 15, the tanks holding enough water for a complete foaming operation. It will be understood, of course, that the chest or manifold may be supplied with water direct from the mains instead of from storage tanks.

Molten slag is supplied to the surface of the foaming bed 8 from a ladle 16 which is mounted on a wheeled carriage 17 running on track rails 18 at the side of the foaming bed. The slag may be poured from the ladle 16 on to the foaming bed by a tilting of the ladle on its carriage or by bringing it over the foaming bed and then tilting it by means of lifting and tilting tackle (not shown).

The foaming bed is shown to be arranged horizontally, but it may be inclined slightly to promote the spreading of the molten slag thereover.

In Figure 2 the slag in foamed condition and ready for removal from the foaming bed is indicated at 19.

With the arrangement of feed pipes 11 and control valves 13 illustrated in Figures 1 and 2, the amount of water flowing to each of the jets 10 can be controlled independently.

Figure 3 shows a different connection of the feed pipes to the jets 10. Here the same number of jets are used and they are positioned in the same way as in the preceding figures. In this instance, however, the jets are divided into three groups each of which is fed by a single feed pipe 11' from the chest or manifold 12, the latter being provided with three control valves 13, one for each pipe serving a group. The chest or manifold is supplied with water in the same manner as before.

It will be appreciated that the grouping arrangement indicated in Figure 3 is given only by way of example and that a greater or lesser number of groups may be employed.

Where the foaming bed is composed of porous aggregate or honeycombed concrete, Figure 4 indicates the possibility of supplying through the jets 10 such a quantity of water that not only is the bed 8" completely saturated, but a film or layer 20 of water is provided and maintained on top of the bed 8" during the pouring of the molten material.

Figure 5 illustrates means enabling an even distribution of the molten slag over the foaming bed to be obtained. Such means consist of a wheeled trough 21 bridging the foaming bed 8"' and running on track rails 22 arranged at the sides of the bed, the trough being provided with a plurality of outlet spouts 22a. The trough is supplied with molten slag through one or more spouts 23 extending from the ladle 16' which is mounted on a wheeled carriage 17 running in track rails 18 as before.

A suitable constriction of water jet is illustrated in Figure 6. The jet consists of a throat portion 28, the lower end of which is joined to the feed pipe 11 and the upper end of which is provided with a flared mouth 29, the whole being set in concrete 30 which protects the jet and pipes from the effects of heat and from mechanical damage from tools or tackle used for removing the foamed slag from the foaming bed.

What I claim is:

1. Apparatus for the production of a porous foamed material from slag or other smelts, comprising a bed of porous honeycombed concrete upon which molten slag is adapted to be poured, a plurality of jets spaced about the interior of said bed, a network of pipes connecting said jets to a source of water for supplying water to said jets and to the interior of said bed, and means located between said source and said jets for controlling the amount of water supplied to said bed until the whole quantity of molten slag has been foamed.

2. Apparatus as claimed in claim 1 wherein the control means is adapted to control the supply of water to each of said jets independently of the others.

3. Apparatus as claimed in claim 1 wherein the jets and their pipes are arranged in groups, the control means being adapted to control the amount of water passing to each of said groups independently of the others.

MARCEL GALLAI-HATCHARD.

REFERENCES CITED

The following references are of record in the file of this patent:

UNITED STATES PATENTS

| Number | Name | Date |
| --- | --- | --- |
| 1,163,605 | Schol | Dec. 7, 1915 |
| 2,067,356 | Swinhoe | Jan. 12, 1937 |
| 2,212,962 | Stuart et al. | Aug. 27, 1940 |